INVENTOR
Gerhard F. Pfeiffer

April 2, 1968  G. F. PFEIFFER  3,376,239
PROCESS OF MANUFACTURING AMINOPLAST MOLDING POWDER
Filed June 7, 1965  2 Sheets-Sheet 2

INVENTOR
Gerhard F. Pfeiffer

BY McCoy, Greene & te Grotenhuis
ATTORNEYS

United States Patent Office 3,376,239
Patented Apr. 2, 1968

3,376,239
PROCESS OF MANUFACTURING AMINOPLAST MOLDING POWDER
Gerhard F. Pfeiffer, Auburn Road, Landenberg, Pa. 19350
Continuation-in-part of application Ser. No. 143,486, Oct. 6, 1961. This application June 7, 1965, Ser. No. 469,363
6 Claims. (Cl. 260—17.3)

ABSTRACT OF THE DISCLOSURE

An unusually high flow urea-aldehyde or melamine-aldehyde molding powder is controllably produced by a substantially dry reaction in a closed vessel of para-formaldehyde and the solid amine in the presence of a finely divided filler and an alkaline catalyst, and flash-drying and grinding the moist reacted mixture in a high velocity gas, as for example in a fluid energy mill.

Figure 1:
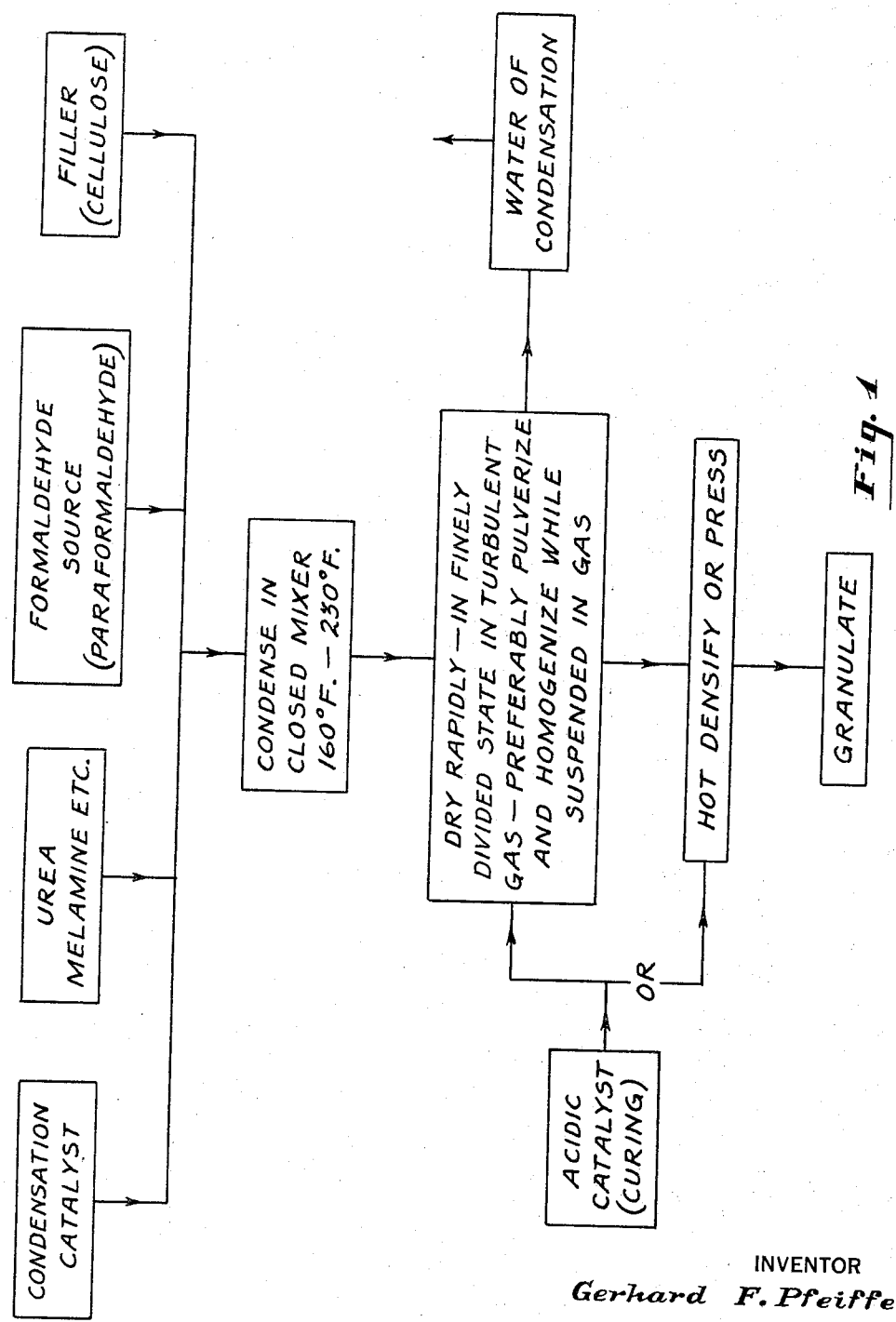

The present invention relates to the manufacture of thermosetting molding compounds by a dry reaction process as opposed to the conventional, wet process. In particular, this invention is directed to the manufacture of improved urea-paraformaldehyde molding compounds, melamine-paraformaldehyde molding compounds, thiourea-paraformaldehyde, urea-paraformaldehyde molding compounds, mixtures thereof, etc.

This application is a continuation-in-part of my co-pending United States patent application Ser. No. 143,486, filed Oct. 6, 1961, now abandoned.

In the conventional wet process for the manufacture of urea-formaldehyde molding compounds or melamine-formaldehyde molding compounds, and the like, the amine such as urea and the aldehyde such as formaldehyde, paraformaldehyde, etc., are partially condensed to form a syrup and a suitable amount of filler is mixed with the syrup formed. This resulting filler and syrup admixture is dried at carefully controlled temperatures to remove the water content while simultaneously terminating copolymerization and substantially precluding any cross-linking reactions. The dry material formed then must be densified and ground, usually in a ball mill, to a very fine mesh, the fine powder resulting being finely granulated as is always required.

In the prior art dry process, the amine-aldheyde molding composition (as recently developed by Leopold F. Bornstein of Wilmington, Del., and as disclosed in U.S. Patent No. 2,841,565, filed June 15, 1956), a solid amine and a solid aldehyde, such as urea and paraformaldehyde solid, are reacted, preferably in the presence of a filler, at a temperature level of about 200° to 230° F., preferably around 210° F. in a suitable mixture such as ribbon blender mixer until the condensation reaction is substantially completed and then quickly cooled down to room temperature. The reaction mixture then is compacted or densified for 2 to 4 minutes in a densifier such as a Beardsley & Piper densifier, discharged into one or more cutters, and subsequently granulated.

This reaction process for producing molding compositions is described in U.S. Patent No. 2,841,565 (to Bornstein, supra). Although the products made in accordance with the Bornstein patent were capable of being compression-molded, they are not capable of being uniformly injection-molded or transfer-molded as will be more fully pointed out hereinafter.

It is to be emphasized that the dry process described in U.S. Patent No. 2,841,565 is disadvantageous in that a resulting product is formed which is not uniform from batch to batch. Particles often remain in the product which are non-uniformly distributed therein and added pigments and dyes do not uniformly impregnate the Bornstein product-material. When attempts were made to make the product more uniform by grinding it in a ball mill (even one water cooled) or pulverizer, the heat due to frictional-working advances the material to such an extent that properties become inferior.

In accordance with the present invention, the foregoing disadvantages are overcome and there is provided an improved process of manufacturing thermosetting amine-paraformaldehyde molding compounds by the Bornstein dry process using less required steps than required in accordance with the Bornstein patent. Furthermore, according to the invention, the resulting molding compositions can be injection-molded and transfer-molded, which the Bornstein products cannot.

Figure 2:
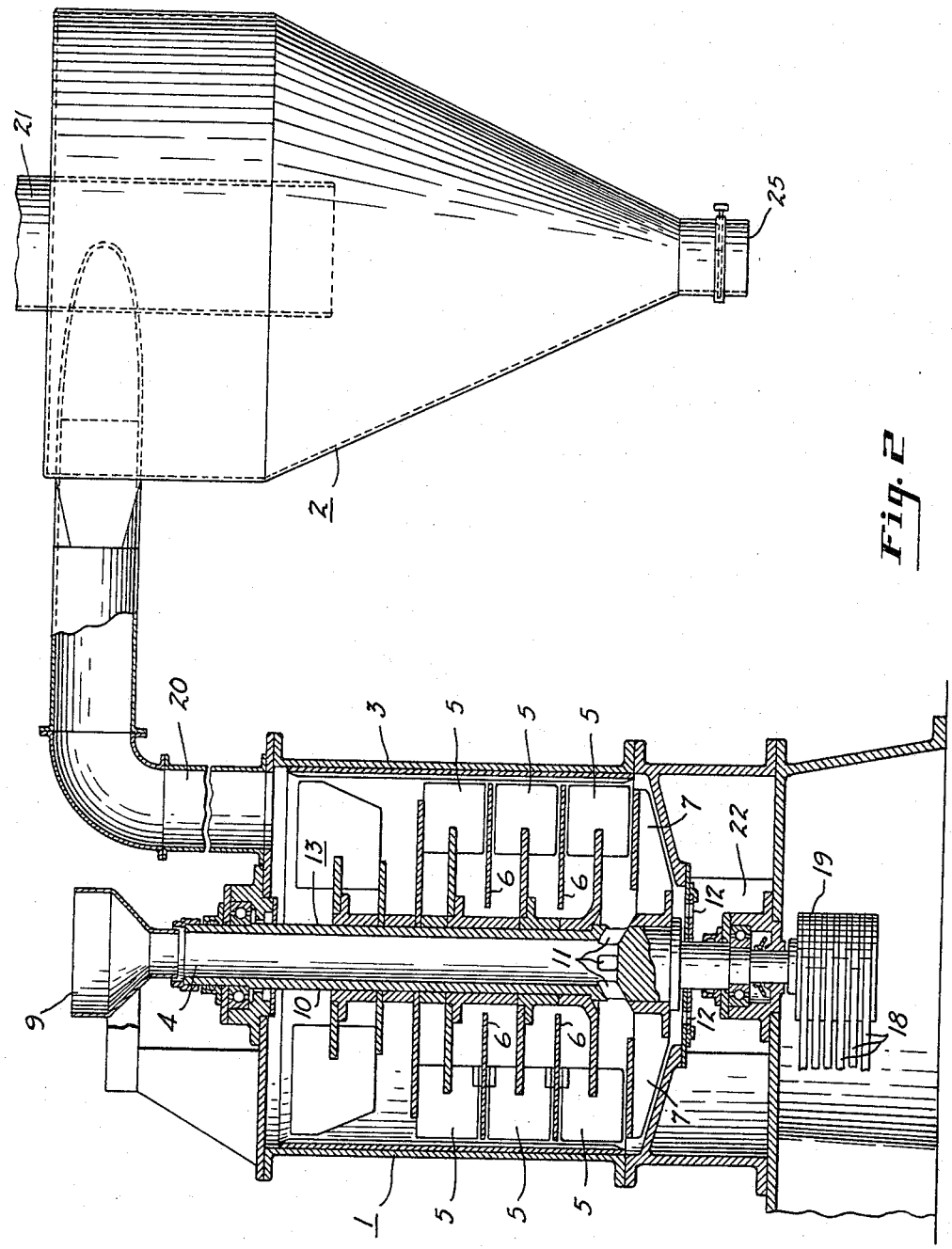

These and other advantages of the invention will be apparent from the following description of the invention as illustrated in part by the drawing, wherein FIGURE 1 is a flow-sheet illustrating the process of the present invention; and FIGURE 2 is an elevational view, partly in section, of preferred apparatus used in the central drying and grinding or homogenizing step in which, prior to densification, moist, suspended, solid-amine-paraformaldehyde reaction material particles are simultaneously dried and comminuted by suspending said product particles in an inert gas and abrading said moist suspended reaction material particles against other moist, suspended reaction material particles derived from solid reactive amines and solid paraformaldehyde.

The initial resin forming reaction is carried out in accordance with the invention as set forth in Patent 2,841,565 in the presence of filler and of desired other compounding ingredients and brings about simultaneous impregnation of most of the filler. The resin forming ingredients, i.e., urea, melamine, thiourea or mixtures of urea and melamine etc., suitable alkaline condensation catalyst, formaldehyde donor such as paraformaldehyde or highly concentrated formaldehyde solution are introduced in dry form along with the filler such as alpha cellulose wood flour or the like into a suitable mixer which is closed to confine the ingredients within a space during a mixing operation and limit the escape of water vapor caused during condensation-polymerization.

The mixing zone is usually a jacketed mixer such as ribbon blender, or similar mixer which is closed with a lid and restricts escape of vapors. The material in the mixture is at all time free flowing and easy to handle. The amount of water added or present initially is small thereby obviating the many drying steps of the prior art. The material is heated with mixing until the temperature has been brought to the point where the condensation reaction takes place. This is preferably around 170° or 180° F. to 200° to 230° F. However, the temperature may be varied as hereinafter described.

The water from the condensation reaction causes the mixture to become wet and permits the impregnation of the filler during the reaction so that intimate interaction between filler and amine aldehyde resin derived from a solid reactive amine and solid paraformaldehyde may occur. The mixing is continued until the desired state of condensation has occurred. It is found to be essential and important that the initial reaction be confined or closed-zone as stated above where the escape of water vapor will be limited but it is not necessary to operate in an air-tight container or under pressure such as in an autoclave.

When the condensation reaction is completed, the lid of the ribbon blender is opened and the reacted material rapidly cooled down. The material at this point is quite moist and contains about 20% water by weight.

In accordance with the present invention, after the condensation and cooling in the mixer, the flowable material in the form of a moist powder is subjected to an intensive grinding or agitation by suspending the moist powder in gaseous fluid which is sufficiently turbulent to simultaneously dry and comminute the resulting cold, moist reaction material suspended particles by abrading suspended particles against other suspended cold, moist reaction material particles. The gaseous fluid may be air, nitrogen or other gas which is not reactive with the powder and which is present in substantial volume. During this grinding, large areas of surface of the material are exposed to the gas so that temperatures are controlled and the material is both ground or homogenized and dried without appreciably increasing temperature above that of the gas which is normally at about room temperature.

The fine powder or flour resulting from the grinding operation is then densified or compacted and granulated as described in Patent 2,841,565. However, because the powder is dry, much shorter densification time is required, by which I mean 1 to 2 minutes in the Beardsley & Piper machine previously referred to. The densification may be by pressure in a heated press; by extrusion and compacting apparatus such as mill rolls or an extruder mixer such as that known as a Ko-Kneader; by a muller etc. During the grinding operation, or just prior thereto, or if a mixing type of densifier is used just prior to densification, curing catalyst, preferably a latent one which is acid at elevated temperatures, dies, pigments, mold lubricant etc. may be incorporated so that they are dispersed completed throughout the grinding.

The temperature to which the mixture of ingredients in the enclosed mixing zone is raised determines in substantial measure the time and degree of condensation and properties of the product. The most desirable condensation temperature also depends to some extent on type of densification i.e., whether densification is with or without mixing and under conditions where residual water vapor may escape. When densification is by pressing between hot solid platens, escape of water vapor is difficult and a somewhat higher condensation is desired than when densification is with hot mixing or in a muller or extruder-mixer such as a Ko-Kneader. The temperature of condensation i.e., the temperature of material in the mixer should not usually exceed 230° F. for even a very hard flow resin. It may be as low as 160° for a very soft flow resin. Preferred condensation-polymerization temperatures are from about 175° to 225° F.

Usually during the condensation, the water present will be that amount liberated in the condensation reaction, however, a controlled amount of water may be added at the beginning of the reaction either by using some aqueous formaldehyde solution or by adding a very small amount of water with the formaldehyde donor such as paraformaldehyde. Because the amount of water present is limited, the heat contained in the reaction mixture usually is sufficient to cause a large portion of all the water to pass off as vapors as soon as the material from the condensation reaction is removed from the reaction zone. However, some moisture remains in the material which must be removed. When this is done in the usual drying ovens as used in the prior art, various degrees of advancement of the material occurs and much blending of the resulting product is required.

By removing most of or susbtantially all of the water while simultaneously grinding or homogenizing in a large amount of excess gaseous material such as air, the temperature of the air as well as water vapor content (which control the product produced), are regulated so that the resulting product retains an unbelievable amount of uniformity and plasticity. Since grinding occurs while suspended in air or gas, adhesion of surfaces because of the tacky material is avoided. Therefore, one is able to provide by the proper invention a material which is exceptionally soft or has exceptionally high flow and can be molded and cured at relatively low temperatures and at relatively high speed. For instance, the Bornstein product is non-uniform and cannot be injection-molded or transfer-molded, whereas, the product of the present invention can be uniformly injection-molded and transfer-molded.

By the passing of large volumes of air or gas around the particles of finely divided product as by grinding the mixture from the condensation zone in many volumes of rapidly moving air, the moisture reduction is almost instantaneous because of the small size of the particles and ease of transfer of moisture then there. This result is quite different from either removing all the water of condensation by drying a mass in an oven or even by removing all of the water in a densifier or kneader as was done according to Patent 2,841,565.

When moisture is removed even from a crumb-like material, the surface where moisture may escape is very limited. The result is a non-uniform material. Similarly when all the moisture is removed by mixing, the ratio of surface to mass is always small and over-reaction results. The almost instantaneous reduction of moisture appears to be an important feature of my improved process permitting extremely good control in flow characteristics of the product.

As seen from the above, the manufacturing process of the present invention utilizes four stages, namely: (1) the condensation of the amine compound with formaldehyde and filler in the presence of a condensation catalyst of which many are known (usually any alkaline material), (2) a grinding and drying operation while the reaction material is suspended in gaseous fluid such as air, nitrogen, or other non-reactive gas to provide extremely high surface area and almost instantaneous removal of most excess water, (3) a densifying or compressing operation upon the powder in the presence of an acid catalyst and (4) a granulating operation upon the densified material to produce the molding powder desired. The curing catalyst is used to provide an acid pH at molding temperatures and also may be added before the densifying step.

Referring more particularly to FIGURE 2 of the drawings, one type of apparatus suitable for rapidly drying and grinding the flowable material from the initial condensation reaction zone is illustrated. This apparatus consists essentially of a grinding unit 1 and a collector 2. The basic features of the grinding unit 1 are described in detail in Lecher Patents Nos. 2,752,097 and 2,709,552, the specifications of which are incorporated herein and made a part hereof by reference. It comprises a rotor 13 and a substantially cylindrical stator or housing 3 that encloses the rotor. The rotor comprises a shaft portion 4 and a plurality of rotatable, vibrating blades 5 attached thereto for rotation with said shaft, intermediate vibratory disc 6 which separate each stage of the vibrating blades. A fan having blades 7 is also carried by the shaft and is rotatable therewith.

The general description of the apparatus is set forth in the aforementioned Lecher patents. The grinding apparatus shown is modified somewhat from that of the Lecher patents by utilizing a hollow shaft in the rotor as the feed instead of the screw feed which is not found to be as desirable. The shaft is provided with a funnel shaped entrance opening 9 where the moist flowable material from the condensation zone is incorporated. The material passes down through the hollow shaft 10 and through the openings 11 into contact with the blades where it is ground or pulverized by the ultrasonic motion imparted by the vibratory movement of the blades when the rotor is revolved at high speed. The grinding occurs while the material is moved in a large volume of gas or air. The rotor speed, of course, depends on diameter but is usually 7000 or 8000 r.p.m. in the case of a rotor about 24 inches in diameter. The air which is generated by fan blades 7 is sucked through the openings 12 to suspend the particles during the grinding and homogenizing operation. The volume of air or other gas inert to the urea or melamine-formaldehyde such as nitrogen, helium, fluorinated hydrocarbons, such as a chlorofluoromethane etc. is many times the volume of the material ground. It may be pretreated if desired to dry it or to cool or heat it. The finely ground material, while suspended in air, passes through the conduit 20 into the cyclone collector 2. The air or gas from the collector is removed through the central opening 21 in the usual manner and may be dried and returned through opening 22 to the openings 12 thus providing a closed circuit to exclude dirt that may be carried by the air. Preferably, however, the air or gas from the cyclone collector is first passed through the pipe 21 to a suitable bag type filter (not shown) which removes all solids not deposited in the cyclone collector. This air or gas from the filter, if returned to the opening 12 should first be passed through a drying zone or cooling apparatus (not shown) to remove water picked up from the powder. The ground, substantially dry material is removed from the opening 25 in the collector in the usual manner. The power is applied to the grinding apparatus by means of the belts 18 from a suitable source (not shown). Rotation of the pulley 19 and the shaft attached thereto thus occurs as described in the aforementioned Lecher patents.

The apparatus of FIGURE 2 may be substituted by fluid energy mills of other types operated by relatively dry, high pressure gas such as air with less than 80% relative humidity. I have found that it has not been necessary to control humidity of the atmospheric air available at any time of the year in order to obtain a uniform product from day to day. In place of fluid energy mills, a high speed jet of inner gas or air may be used to finely disperse and suspend and rapidly dry the powder from the condensate. The simultaneous grinding operation however, provides a superior product in view of the fact that any particles, foreign matter etc. are also removed by such grinding operation as above described.

The following examples illustrate the invention:

EXAMPLE I

| | Lbs. |
|---|---|
| Alpha-cellulose | 50 |
| Urea | 79 |
| Paraformaldehyde | 60 |
| Ammonia | 0.65 |
| Hexamine | 3 |
| Zinc stearate | 0.25 |
| Pigments and dyes depending on desired color. | |

EXAMPLE II

| | |
|---|---|
| Alpha-cellulose | 50 |
| Melamine | 80 |
| Paraformaldehyde | 60 |
| Ammonia | 0.65 |
| Hexamine | 3 |
| Zinc stearate | 0.25 |
| Water | 10 |
| Pigments and dyes depending on desired color. | |

EXAMPLE III

| | |
|---|---|
| Woodflour | 75 |
| Thiourea | 80 |
| Paraformaldehyde | 50 |
| 37% liquid formaldehyde | 25 |
| Ammonia | 0.65 |
| Hexamine | 3 |
| Zinc stearate | 0.25 |
| Pigments and dyes depending on desired color. | |

The material for each of the above examples was treated in the same manner. It was placed in a ribbon blender which was fitted with a heavy metal lid and which was provided with a jacket at the lower one-half thereof into which steam is passed. Steam was passed in the jacket of the blender until the material reached a temperature of 107° F. The material was maintained at between 170° and 180° F. for about 15 minutes with constant mixing while the escape of water vapor formed by the reaction was limited both by the mass of material and the lid, whereupon the material was removed from the blender and fed slowly into the homogenized and grinding apparatus illustrated in FIGURE 2. The material removed from the collector 2 had about the consistency of flour.

The dried material from the collector 2 in each instance was roughly mixed with about 1% by weight of glycerolchlorhydrin mixture incorporated into a muller, i.e., a Beardsley & Piper densifier having a heat of about 200° applied to the rim thereof and densified for about one minute whereupon any residual moisture over that desired was removed. The densified material was rapidly cut and granulated in a ball and jewel cutter and screened to produce a molding powder of the desired granulation.

The densification and the condensation steps may be as described in Patent 2,841,565. The explosive type of drying as is accomplished by the high surface to mass ratio of the material in gas is found to greatly improve the properties of the product produced.

The product produced in the above examples has exceedingly high flow and is suitable for molding on the very rapidly acting type of molding equipment. The molded article still had excellent physical properties. The molded article in which urea is the amaine compound had superior water-resistance and other properties.

In place of the ribbon blender, other suitable mixing apparatus which restricts the escape of water vapor may be used. Also, other types of drying in gas preferably while simultaneously grinding may be used. The material being in a relatively finely divided state surrounded by air dries suddenly or exceedingly rapidly so there is no appreciable time required for migration of moisture to the surface. Drying only while grinding in a ball mill or drying in the Beardsley & Piper densifier etc., as described in Patent 2,841,565 provides a material in which the flow properties are not uniform from batch to batch and I have been unable to make materials of exceedingly high flow as produced in the present process. In place of the Beardsley & Piper densifier, an extruder mixer such as a Ko-Kneader which permits vapors to be evolved during the mixing operation is preferably used. The densification may also take place by means of a Banbury mixer, etc.

Various modifications in the procedure as well as various substitutions or changes in the proportions of the ingredients of the composition may be made without departing from the invention. For example, the ratio of the filler to the amino component and/or aldehyde may be varied over a wide range depending on the desired translucency and strength characteristics. Any suitable filler, such as walnut-shell flour, sulfite pulp, glass fiber, asbestos, other mineral fillers, keratin, cellophane and similar materials may be used in place of alpha-cellulose or woodflour. Likewise, similar amino compounds such as biuret may in part replace urea, melamine or thiourea or mixtures of these. Any buffering alkali, such as triethanol amine, can be used in place of ammonia as long as the alkaline conditions are equal. I prefer to use ammonia because of its reactivity with formaldehyde and the effect of the formed hexamine on the final curing speed.

While the improvement had by grinding and rapidly drying the wet filler resin mixture is outstanding in the case of the dry process as above described, the rapid drying and grinding of the wet resin-filler mixture resulting from the usual process (wherein the amino compound is condensed with aqueous formaldehyde to produce a syrupy condensate and the condensate is mixed with cellulosic filler) also provides a product of improved properties.

I prefer to add hexamine in two steps. It is added in the first step to establish an alkaline condition favorable to the promotion of the condensation reactions. Addition of hexamine in the second stage tends to speed up the final curing of the molding compound in the subsequent hot molding operation. The hexamine added in the second state partially decomposes during the densifying operation and during the subsequent molding operation to release additional formaldehyde which speeds up the molding or curing operation. The amount of hexamine introduced in the second stage may be either increased or decreased depending on the curing speed required.

When using a high proportion of filler or a relatively high proportion of pigments, it is sometimes advantageous to introduce a small amount of water—say up to 20% but preferably less than 10% by weight of the total dry weight of the ingredients of the reaction mixture—to improve the impregnation of the filler and dispersion of the pigments and other additions more uniformly throughout the mixture.

Although the invention may be practiced with use of a wide range of curing catalysts, and especially those known as latent catalysts, I prefer to use epichlorohydrin because it has a number of advantages not possessed by any single catalyst heretofore used so far as I am aware. In the first place, it is a liquid and, therefore, easy to disperse. It is very inactive at low temperatures and, therefore, can be added even at an early stage of the mixing without curing the resin. This catalyst has a very rapid curing action at conventional molding temperatures. The use of the epichlorohydrin as a latent catalyst in molding compositions is the subject of Patent No. 2,810,700. Although it is advantageous to add the curing catalyst to the powder after the homogenizing and grinding and substantially all of the water has been driven off, it is also possible to add the catalyst to the wet filler-resin mix after condensation or in the densifier up to a minute or two before the material is ready to be discharged from the densifier. When the curing catalyst (usually acidic at molding temperature) used is more reactive than epichlorohydrin under the conditions obtaining either in the mixer or the densifier, it will be desirable to postpone its addition to the mixture until near the end of the densifying operation in the densifier.

In order to more fully illustrate but not to limit the present invention, the following examples are given also:

Example I-A

As described in Examples 1, 2 and 3 of the Bornstein Patent 2,841,565, batches of urea-paraformaldehyde molding powder, melamine-paraformaldehyde molding powder, and thiourea-paraformaldehyde molding powder were prepared at 200°–230° F. In all three instances the resulting products could be compression-molded but were not capable of being either injection-molded or transfer-molded.

Example II-A

Example I-A was repeated except that prior to charging the reaction material particles into a heated densifier, as described in column 4 of the Bornstein patent, in accordance with the invention, the moist reaction material particles were first suspended at room temperature into a large volume of a stream of high velocity, turbulent air with the result of simultaneous drying and comminuting of the resulting suspended reaction material particles by grinding such reaction material particles together against other suspended reaction material particles.

Following this, the resulting mixture then was charged, as disclosed in the Bornstein examples, into a heated densifier and the balance of the Bornstein densification and granulation process carried out as in Example I-A.

In all three instances the resulting products could be compression-molded as in Bornstein and also were capable of being both injection-molded and transfer-molded, in accordance with the invention.

Further tests showed that the present improvement was apparent over a molding powder preparation range of 170° to 230° F., that the suspension-step improves all three types of resins disclosed in the Bornstein patent, that the suspension-step of the present invention may occur directly following condensation-polymerization, may occur following the Bornstein drying step for 5–15 minutes at 180° F., may take place after the reaction material has cooled, or may take place after mixing—with or without blended hexamine or epichlorohydrin. However, the tests showed that the suspension-step of the invention is not effective to improve the Bornstein product if the resulting reaction mixture particles have been either granulated or densified prior to such suspension step.

Resort may be had to modifications and variations of the disclosed embodiments of the invention without departing from the spirit of the invention or the scope of the appended claims.

What is claimed is:

1. In a process of manufacturing a thermosetting molding powder, wherein paraformaldehyde and an amine, selected from the group consisting of urea, melamine, thiourea, and mixtures thereof, are condensed in the presence of a finely divided filler, selected from the group consisting of cellulosic fillers, asbestos and glass fibers, and an alkaline catalyst at a temperature not above about 230° F. in the presence of less than 20 weight percent of water, and the materials are maintained during condensation-polymerization in a substantially confined zone to prevent drying of the ingredients en masse, the improvement which comprises passing the resulting moist particles of reaction material into a high velocity stream of gas, grinding suspended moist reaction material particles against other suspended, moist reaction material particles, drying suspended reaction material particles while suspended in said gas and thereafter densifying the product obtained in the presence of a curing agent, and subsequently granulating the resulting densified reaction-material particles.

2. In a process of manufacturing a thermosetting molding powder, wherein paraformaldehyde and a solid amine, selected from the group consisting of urea, melamine, thiourea, and mixtures thereof, are condensed in the presence of a finely divided cellulosic filler and an alkaline catalyst at a temperature not in excess of about 230° F., to obtain a moist reaction product, and the resulting moist reaction material particles formed during condensation-polymerization are maintained in a substantially confined zone to prevent drying en masse of said particles, the improvement which comprises suspending said moist particles of reaction material in a stream of gas that is inert thereto so as to dry said particles, and homogenizing the resulting reaction material particles in said gas by abrading said suspended reaction material particles against other suspended reaction material particles, and thereafter densifying the product thus obtained in the presence of a curing agent and subsequently granulating the resulting densified reaction material particles.

3. In a process of manufacturing a thermosetting molding powder, wherein paraformaldehyde and an amine, selected from the group consisting of urea, melamine, thiourea, and mixtures thereof, are condensed in the presence of a finely divided filler, selected from the group consisting of cellulosic fillers, asbestos, and glass fibers, and an alkaline catalyst at 170° to 230° F., to obtain a moist reaction product, and the resulting moist reaction material particles are maintained in a substantially confined zone to prevent drying en masse of said moist reaction material particles, the improvement which comprises suspending said moist reaction material particles in a high velocity, turbulent stream of inert gas, simultaneously drying and comminuting the moist, suspended reaction material particles by grinding said suspended particles together against other suspended reaction material particles, and, thereafter densifying the product thus obtained in the presence of a curing agent, and, subsequently granulating the resulting densified reaction material particles formed.

4. A process according to claim 1 wherein the said solid amine comprises urea.

5. A process according to claim 1 wherein the said solid amine comprises melamine.

6. A process according to claim 1 wherein the said solid amine comprises a mixture of urea and melamine.

References Cited

UNITED STATES PATENTS 2,595,335   5/1952   Cornwell _____ 260—17.3

FOREIGN PATENTS 597,726   2/1948   Great Britain.
607,300   8/1948   Great Britain.

OTHER REFERENCES

Perry, Chemical Engineers Handbook, 3rd ed., McGraw-Hill Book Co., Inc., 1950, pages 834, 836.

WILLIAM H. SHORT, *Primary Examiner.*

E. M. WOODBERRY, *Assistant Examiner.*